(12) United States Patent
Ren

(10) Patent No.: US 9,964,364 B2
(45) Date of Patent: May 8, 2018

(54) MULTI-LAYER ALUMINUM ALLOY SHEET PRODUCT FOR TUBES FOR HEAT EXCHANGERS

(71) Applicant: ALCOA INC., Pittsburgh, PA (US)

(72) Inventor: Baolute Ren, Lititz, PA (US)

(73) Assignee: Arconic Inc., Pittsburgh, PA (US)

(*) Notice: Subject to any disclaimer, the term of this patent is extended or adjusted under 35 U.S.C. 154(b) by 0 days. days.

(21) Appl. No.: 13/891,824

(22) Filed: May 10, 2013

(65) Prior Publication Data
US 2013/0302642 A1 Nov. 14, 2013

Related U.S. Application Data

(60) Provisional application No. 61/645,126, filed on May 10, 2012.

(51) Int. Cl.
*F28F 1/00* (2006.01)
*B32B 1/08* (2006.01)
(Continued)

(52) U.S. Cl.
CPC .......... *F28F 1/003* (2013.01); *B23K 35/0233* (2013.01); *B23K 35/0238* (2013.01); *B32B 1/08* (2013.01); *B32B 15/016* (2013.01); *B32B 15/043* (2013.01); *B32B 15/20* (2013.01); *C22C 21/00* (2013.01); *C22C 21/02* (2013.01);
(Continued)

(58) Field of Classification Search
CPC ....... B32B 1/08; B32B 15/016; B32B 15/043; B32B 15/04; B32B 15/20; C23C 30/00; C23C 30/005; C22C 21/00; C22C 21/02; C22C 21/06; C22C 21/08; Y10T 428/12764; Y10T 428/12736;
(Continued)

(56) References Cited

U.S. PATENT DOCUMENTS 6,167,619 B1 * 1/2001 Beagle ................ B21D 53/085
29/727
6,667,115 B2 * 12/2003 Goodrich ............. B23K 1/0012
165/133
(Continued)

FOREIGN PATENT DOCUMENTS

WO 2006/039303 4/2006
WO 2007/131727 11/2007
WO 2008/110270 9/2008

OTHER PUBLICATIONS

MatWeb, "Overview of Materials for 3000 Series Aluminum Alloy," downloaded from www.matweb.com on May 5, 2014, 3 pages, no date.*
International Search Report and Written Opinion of the International Search Report dated Nov. 29, 2013 from corresponding PCT application No. PCT/US2013/040615.
(Continued)

*Primary Examiner* — Michael E. La Villa
(74) *Attorney, Agent, or Firm* — Greenberg Traurig, LLP

(57) ABSTRACT

An aluminum sheet product comprises: a core layer comprising one of a 3xxx, 5xxx and 6xxx aluminum alloy; and a liner layer comprising one of a 3xxx aluminum alloy having an additive of 0.5-5% Zn, and a 7xxx aluminum alloy. In some embodiments, the aluminum sheet product r has an O temper pre-braze tensile strength of at least 20 Ksi. In some embodiments the corrosion potential difference between the liner and core is at least 30 millivolts. In some embodiments, the aluminum sheet product further comprises an inner layer comprising one of a 3xxx and a 4xxx aluminum alloy.

18 Claims, 2 Drawing Sheets

(51) Int. Cl.
  *B32B 15/01*   (2006.01)
  *B23K 35/02*   (2006.01)
  *B32B 15/04*   (2006.01)
  *C22C 21/06*   (2006.01)
  *B32B 15/20*   (2006.01)
  *C22C 21/08*   (2006.01)
  *C22C 21/00*   (2006.01)
  *F28F 21/08*   (2006.01)
  *C22C 21/02*   (2006.01)

(52) U.S. Cl.
  CPC .............. *C22C 21/06* (2013.01); *C22C 21/08* (2013.01); *F28F 21/084* (2013.01); *Y10T 428/12354* (2015.01); *Y10T 428/12361* (2015.01); *Y10T 428/12375* (2015.01); *Y10T 428/12736* (2015.01); *Y10T 428/12764* (2015.01); *Y10T 428/13* (2015.01)

(58) Field of Classification Search
  CPC .......... Y10T 428/13; Y10T 428/12354; Y10T 428/12361; Y10T 428/12375
  USPC .................................. 428/654, 34.1
  See application file for complete search history.

(56) References Cited

U.S. PATENT DOCUMENTS

| | | | |
|---|---|---|---|
| 7,407,713 B2* | 8/2008 | Kilmer | B22D 11/007 228/56.3 |
| 2003/0009883 A1* | 1/2003 | Thors | F28F 1/40 29/890.03 |
| 2003/0111215 A1* | 6/2003 | Walther | B21B 27/005 165/133 |
| 2006/0118282 A1* | 6/2006 | Ren | B21C 23/005 165/133 |
| 2007/0122648 A1* | 5/2007 | Vieregge et al. | 428/654 |
| 2008/0011816 A1* | 1/2008 | Kilmer | 228/262.51 |
| 2010/0159272 A1 | 6/2010 | Marois et al. | |
| 2010/0266871 A1* | 10/2010 | Matsuo | B32B 15/016 428/654 |

OTHER PUBLICATIONS

Fourth Office Action issued by the Chinese Patent Office dated Feb. 3, 2017 for Chinese Patent Application No. 201310251015.0.
First Office Action issued by the European Patent Office dated Mar. 7, 2017 for European Patent Application No. 13723652.7.

* cited by examiner

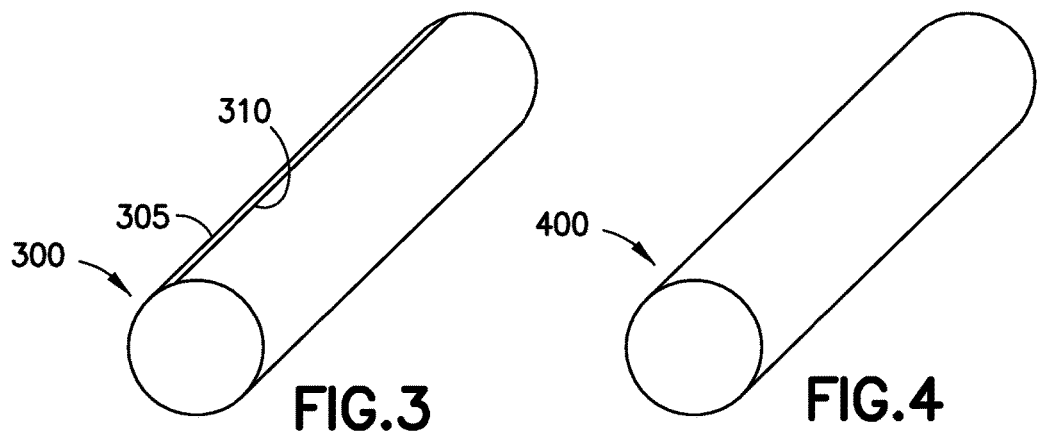
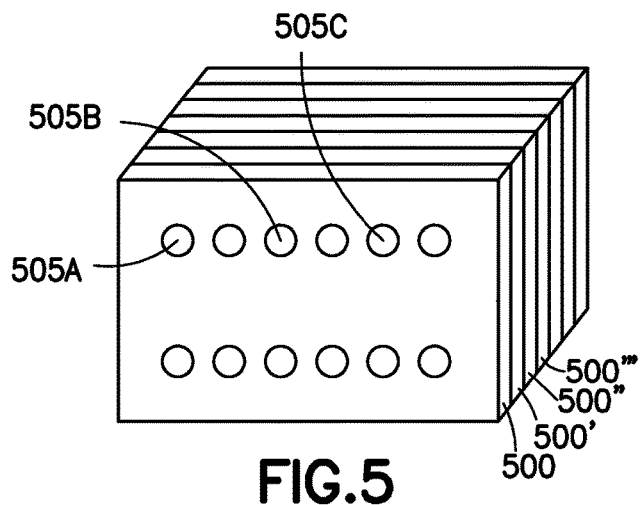
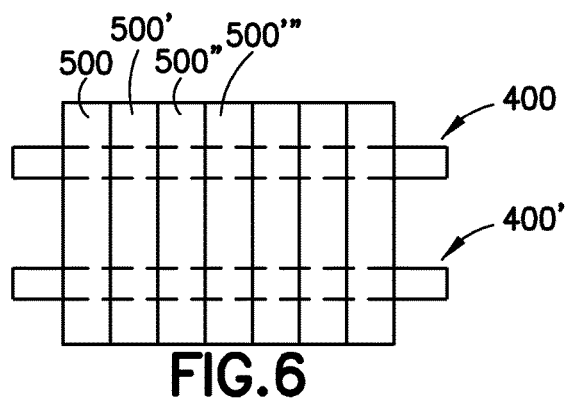

MULTI-LAYER ALUMINUM ALLOY SHEET PRODUCT FOR TUBES FOR HEAT EXCHANGERS

RELATED APPLICATIONS

This application claims priority to prior filed U.S. Provisional Patent Application No. 61/645,126 filed on May 10, 2012, which is incorporated herein by reference.

BACKGROUND OF THE DISCLOSURE

Mechanically assembled heat exchangers are used for residential HVAC application. Past heat exchangers were made of copper, or extruded-single-layer aluminum, tubes and aluminum plate fins. The copper, or extruded-single-layer aluminum, tubes were laced into aluminum fins and then mechanically expanded such that the tube outer surface has close contact with the fins. The heat transfer was achieved in part by the mechanical contact between tubes and fins.

SUMMARY

In various illustrative embodiments, without being bound thereby, the disclosure herein may be summarized as within the following illustrative paragraphs:

An aluminum alloy sheet product comprises a core layer and a liner layer. The liner layer comprises either a 3xxx aluminum alloy having an additive of 0.5-5% Zn, or a 7xxx aluminum alloy. The core layer comprises one of a 3xxx, 5xxx and 6xxx aluminum alloy. A sheet product is a rolled product having a thickness of from 0.006 inch to 0.249 inch.

In some embodiments, the core layer comprises: 0.05-1.2% Si, up to 1.0% Fe, 0.10-1.0% Cu, 0.3-2.0% Mn, up to 1.0% Mg, up to 0.25% Cr, up to 0.25% Zn, 0.10-0.2% Ti, up to 0.2% Zr. In some embodiments, the core layer comprises: Up to 0.5% Si, up to 1.0% Fe, up to 0.5% Cu, up to 1.0% Mn, 0.1-3.0% Mg, up to 0.25% Cr, up to 0.25% Zn, up to 0.2% Ti, up to 0.2% Zr. In some embodiments, the core layer comprises: 0.2-2.0% Si, up to 1.0% Fe, 0.10-1.0% Cu, up to 1.0% Mn, 0.25-1.5% Mg, up to 0.25% Cr, up to 0.25% Zn, up to 0.2% Ti, up to 0.2% Zr.

In some embodiments, the sheet has an O temper pre-braze tensile strength of at least 14 Ksi. In some embodiments, the sheet has an O temper pre-braze tensile strength of at least 16 Ksi. In some embodiments, the sheet has an O temper pre-braze tensile strength of at least 18 Ksi. In some embodiments, the sheet has an O temper pre-braze tensile strength of at least 20 Ksi.

In some embodiments, the liner layer comprises a 3xxx aluminum alloy having an additive of 0.7-4% Zn. In some embodiments, the liner layer comprises a 3xxx aluminum alloy having an additive of 1-3% Zn. In some embodiments, liner layer comprises a 7xxx aluminum alloy having 0.5-5.0% Zn.

In some embodiments the corrosion potential difference between the core layer and the liner layer is in the range of 30 millivolts to 200 millivolts. In some embodiments the corrosion potential difference between the core layer and the liner layer is at least 30 millivolts.

In some embodiments, the aluminum sheet further comprises an inner layer. In some embodiments, the inner layer comprises one of a 3xxx and a 4xxx aluminum alloy. In some embodiments, the inner layer comprises 0.05-1.2% Si, up to 1.0% Fe, 0.10-1.0% Cu, 0.3-2.0% Mn, up to 0.5% Mg. In some embodiments, the inner layer comprises 1.0-12.0% Si, up to 1.0% Fe, up to 1.0% Cu, up to 1.0% Mn, up to 0.5% Mg.

In some embodiments, the aluminum sheet has a thickness in the range of 0.3 millimeters to 1.5 millimeters.

A tube material comprises a core layer and a liner layer. The liner layer comprises either a 3xxx aluminum alloy having an additive of 0.5-5% Zn, or a 7xxx aluminum alloy.

A heat exchanger comprises multi-layer aluminum welded tubes having a high strength core mechanically assembled with aluminum plate fins. The welded tube may have fins embossed onto the internal surface of the tube.

A heat exchanger comprises a tube having a core layer and a liner layer; and a plurality of fins in contact with the tube. The liner layer comprises either a 3xxx aluminum alloy having an additive of 0.5-5% Zn, or a 7xxx aluminum alloy.

In some embodiments, the core layer comprises one of a 3xxx, 5xxx and 6xxx aluminum alloy. In some embodiments, the core layer comprises: 0.05-1.2% Si, up to 1.0% Fe, 0.10-1.0% Cu, 0.3-2.0% Mn, up to 1.0% Mg, up to 0.25% Cr, up to 0.25% Zn, 0.10-0.2% Ti, up to 0.2% Zr. In some embodiments, the core layer comprises: Up to 0.5% Si, up to 1.0% Fe, up to 0.5% Cu, up to 1.0% Mn, 0.1-3.0% Mg, up to 0.25% Cr, up to 0.25% Zn, up to 0.2% Ti, up to 0.2% Zr. In some embodiments, the core layer comprises: 0.2-2.0% Si, up to 1.0% Fe, 0.10-1.0% Cu, up to 1.0% Mn, 0.25-1.5% Mg, up to 0.25% Cr, up to 0.25% Zn, up to 0.2% Ti, up to 0.2% Zr.

In some embodiments, the sheet has an O temper pre-braze tensile strength of at least 14 Ksi. In some embodiments, the sheet has an O temper pre-braze tensile strength of at least 16 Ksi. In some embodiments, the sheet has an O temper pre-braze tensile strength of at least 18 Ksi. In some embodiments, the sheet has an O temper pre-braze tensile strength of at least 20 Ksi.

In some embodiments, the liner layer comprises a 3xxx aluminum alloy having an additive of 0.7-4% Zn. In some embodiments, the liner layer comprises a 3xxx aluminum alloy having an additive of 1-3% Zn. In some embodiments, liner layer comprises a 7xxx aluminum alloy having 0.5-5.0% Zn.

In some embodiments the corrosion potential difference between the core layer and the liner layer is in the range of 30 millivolts to 200 millivolts. In some embodiments the corrosion potential difference between the core layer and the liner layer is at least 30 millivolts.

In some embodiments, the heat exchanger further comprises an inner layer. In some embodiments, the inner layer comprises one of a 3xxx and a 4xxx aluminum alloy. In some embodiments, the inner layer comprises 0.05-1.2% Si, up to 1.0% Fe, 0.10-1.0% Cu, 0.3-2.0% Mn, up to 0.5% Mg. In some embodiments, the inner layer comprises 1.0-12.0% Si, up to 1.0% Fe, up to 1.0% Cu, up to 1.0% Mn, up to 0.5% Mg.

In some embodiments, the tube comprises an aluminum sheet bent in the form of a tube.

In some embodiments, the material forming the tube has a thickness in the range of 0.3 millimeters to 1.5 millimeters. In some embodiments, the tube has an outer diameter in the range of 3 millimeter to 30 millimeters.

In some embodiments, a method of making a heat exchanger comprises: forming a tube from a multi-layer aluminum sheet; inserting the tube into a plurality of fins, each fin having a bore for receiving the tube; and expanding the tube.

In some embodiments, the step of forming a tube from a multi-layer aluminum sheet comprises bending the multi-layer aluminum sheet so that opposite edges of the multi-layer aluminum sheet contact each other and attaching the edges together. In some embodiments, the step of attaching the edges together comprises one of: gluing, welding, soldering and brazing.

In some embodiments, the step of expanding the tube comprises passing a cylindrical mandrel through the tube, wherein an outer diameter of the mandrel is larger than an inner diameter of the tube.

Some embodiments further comprise the step of forming a multi-layer aluminum sheet by bonding a core layer to a liner layer.

In some embodiments, the multi-layer aluminum sheet comprises: a core layer; and a liner layer. In some embodiments of a method of making a heat exchanger, the liner layer comprises either a 3xxx aluminum alloy having an additive of 0.5-5% Zn, or a 7xxx aluminum alloy.

In some embodiments of a method of making a heat exchanger, the core layer comprises one of a 3xxx, 5xxx and 6xxx aluminum alloy. In some embodiments of a method of making a heat exchanger, the core layer comprises: 0.05-1.2% Si, up to 1.0% Fe, 0.10-1.0% Cu, 0.3-2.0% Mn, up to 1.0% Mg, up to 0.25% Cr, up to 0.25% Zn, 0.10-0.2% Ti, up to 0.2% Zr. In some embodiments of a method of making a heat exchanger, the core layer comprises: up to 0.5% Si, up to 1.0% Fe, up to 0.5% Cu, up to 1.0% Mn, 0.1-3.0% Mg, up to 0.25% Cr, up to 0.25% Zn, up to 0.2% Ti, up to 0.2% Zr. In some embodiments of a method of making a heat exchanger, the core layer comprises: 0.2-2.0% Si, up to 1.0% Fe, 0.10-1.0% Cu, up to 1.0% Mn, 0.25-1.5% Mg, up to 0.25% Cr, up to 0.25% Zn, up to 0.2% Ti, up to 0.2% Zr.

In some embodiments of a method of making a heat exchanger, the tube material has an O temper pre-braze tensile strength of at least 14 Ksi. In some embodiments of a method of making a heat exchanger, the tube material has an O temper pre-braze tensile strength of at least 16 Ksi. In some embodiments of a method of making a heat exchanger, the tube material has an O temper pre-braze tensile strength of at least 18 Ksi. In some embodiments of a method of making a heat exchanger, the tube material has an O temper pre-braze tensile strength of at least 20 Ksi.

In some embodiments of a method of making a heat exchanger, the liner layer comprises a 3xxx aluminum alloy having an additive of 0.7-4% Zn. In some embodiments of a method of making a heat exchanger, the liner layer comprises a 3xxx aluminum alloy having an additive of 1-3% Zn. In some embodiments of a method of making a heat exchanger, the liner layer comprises a 7xxx aluminum alloy having 0.5-5.0% Zn.

In some embodiments the corrosion potential difference between the core layer and the liner layer is in the range of 30 millivolts to 200 millivolts. In some embodiments the corrosion potential difference between the core layer and the liner layer is at least 30 millivolts.

In some embodiments of a method of making a heat exchanger, the tube further comprises an inner layer. In some embodiments of a method of making a heat exchanger, the inner layer comprises either a 3xxx or a 4xxx aluminum alloy. In some embodiments of a method of making a heat exchanger, the inner layer comprises 0.05-1.2% Si, up to 1.0% Fe, 0.10-1.0% Cu, 0.3-2.0% Mn, up to 0.5% Mg. In some embodiments of a method of making a heat exchanger, the inner layer comprises 1.0-12.0% Si, up to 1.0% Fe, up to 1.0% Cu, up to 1.0% Mn, up to 0.5% Mg.

In some embodiments of a method of making a heat exchanger, the material forming the tube has a thickness in the range of 0.3 millimeters to 1.5 millimeters. In some embodiments of a method of making a heat exchanger, the tube has an outer diameter in the range of 3 millimeter to 30 millimeters.

BRIEF DESCRIPTION OF THE DRAWINGS

The present disclosure will be further explained with reference to the attached drawing figures, wherein like structures/elements are referred to by like numerals throughout the several views, alphabetized structures/elements indicate multiples of the various structures/elements, and primed numbering is given to mirrored structures/elements. The drawing, figures shown are not necessarily to scale, with emphasis instead generally being placed upon illustrating the principles of the present disclosure.

FIG. 3 is an illustrative perspective view of the material structure of FIG. 1 formed into a illustrative tube stock having a first edge and a second edge;

FIG. 4 is an illustrative perspective view of the tube structure of FIG. 3 have the first edge welded to the second edge to form a round welded tube;

FIG. 5 is an illustrative perspective view of a plurality of fins; and

FIG. 6 is an illustrative side view of the round welded tube of FIG. 4 engaged or associated with the plurality of fins of FIG. 5.

Figure 1:
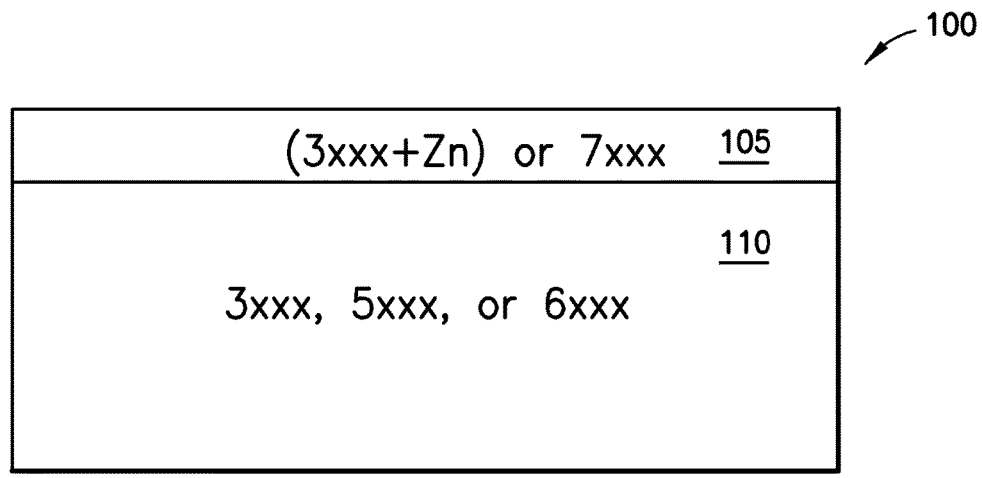
FIG. 1 is an illustrative schematic of an embodiment of a material structure of the present disclosure.

Following the drawing figures are embodiments of several examples of the present disclosure which illustrates various embodiments of the microstructure and properties of the welded metal that is formed in accordance with the processes and apparatuses herein described. These experiments are not limiting of the microstructure and properties of the welded metal as would be understood by one of ordinary skill.

DESCRIPTION

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In an embodiment, with reference to FIG. 1, an aluminum sheet product comprising a two-layer material 100 is provided. The material 100 may include at least a liner 105 and a core 110. The liner 105 may be made of any 3xxx series aluminum alloy having an addition of 0.5-5% Zn. In some embodiments, the 3xxx series aluminum alloy has an addition of 0.7-4% Zn. In some embodiments, the 3xxx series aluminum alloy has an addition of 1-3% Zn. Alternatively, the liner may be comprised of any 7xxx series aluminum alloy.

The core 110 may be made of a 3xxx, 5xxx or 6xxx series aluminum alloy. Possible alloy compositions for the core include: 0.05-1.2% Si, up to 1.0% Fe, 0.10-1.0% Cu, 0.3-2.0% Mn, up to 1.0% Mg, up to 0.25% Cr, up to 0.25% Zn, 0.10-0.2% Ti, up to 0.2% Zr; up to 0.5% Si, up to 1.0% Fe, up to 0.5% Cu, up to 1.0% Mn, 0.1-3.0% Mg, up to 0.25% Cr, up to 0.25% Zn, up to 0.2% Ti, up to 0.2% Zr; 0.2-2.0% Si, up to 1.0% Fe, 0.10-1.0% Cu, up to 1.0% Mn, 0.25-1.5% Mg, up to 0.25% Cr, up to 0.25% Zn, up to 0.2% Ti, up to 0.2% Zr. In some embodiments, the sheet product has an O temper pre-braze tensile strength of at least 14 Ksi. In some embodiments, the sheet product has an O temper pre-braze tensile strength of at least 16 Ksi. In some embodiments, the sheet product has an O temper pre-braze tensile strength of at least 18 Ksi. In some embodiments, the sheet product has an O temper pre-braze tensile strength of at least 20 Ksi.

The liner 105 and core 110 may be cast together using multi alloy casting technology. Alternatively the liner 105 and core 110 may be rolled together in a hot rolling process such that the liner 105 and core 110 are metallurgically bonded together. Applicant presently believes that the liner 105 of the material 100 may provide sacrificial protection when subjected to a corrosive environment (for example as when the material 100 is formed into a tube and used within a heat exchanger of a residential or commercial HVAC unit), and the core 110 may provide sufficient high strength (for example as when the material 100 is formed into a tube and used within a heat exchanger of a residential or commercial HVAC unit). In this manner, Applicant believes that the material 100 may be sufficiently corrosive resistant and of high strength to be used as a tube within a heat exchanger of a residential or commercial HVAC unit. The liner 105 may be between about 5 to about 20 percent of the total thickness of the material 100. In various embodiments, the material 100 may having a total thickness ranging from about 0.5 millimeters to about 1.5 millimeters.

In some embodiments the corrosion potential difference between the core layer and the liner layer is in the range of 30 millivolts to 200 millivolts. In some embodiments the corrosion potential difference between the core layer and the liner layer is at least 30 millivolts.

Figure 2:
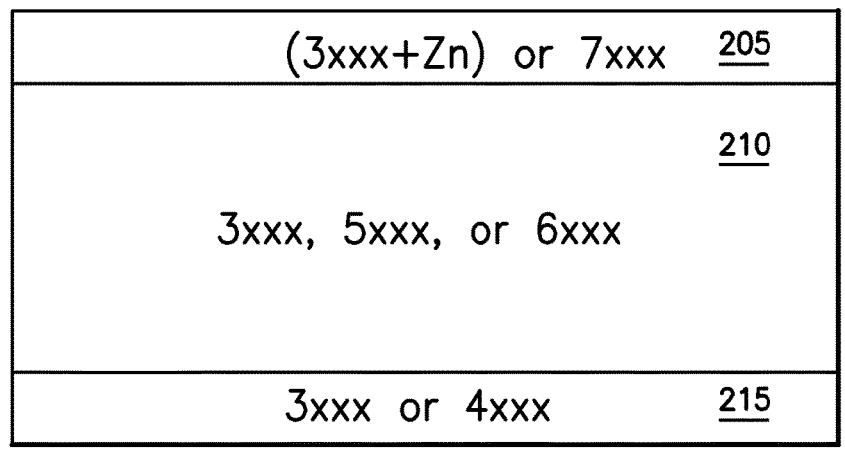
FIG. 2 is an illustrative schematic of an alternative embodiment of a material structure of the present disclosure.

In an alternative embodiment, a material of the present disclosure may have more than two layers, for example three, four, or more layers. With reference to FIG. 2, a material 200 having three layers is provided. The material 200 may include at least a liner 205, a core 210, and an inner layer 215. The liner 205 and the core 210 may have the same compositions as the liner 105 and the core 110 described above.

In some embodiments, the inner layer 215 may comprise either a 3xxx or a 4xxx series aluminum alloy. In some embodiments, the inner layer comprises 0.05-1.2% Si, up to 1.0% Fe, 0.10-1.0% Cu, 0.3-2.0% Mn, up to 0.5% Mg. In some embodiments, the inner layer comprises 1.0-12.0% Si, up to 1.0% Fe, up to 1.0% Cu, up to 1.0% Mn, up to 0.5% Mg. In some embodiments, the inner layer has sufficient formability for embossing so that surface textures can be embossed into the inner layer in order to enhance condensation and heat transfer (for example as when the material 200 is formed into a tube and used within a heat exchanger of a residential or commercial HVAC unit).

The liner 205, core 210, and inner layer 215 may be cast together using multi alloy casting technology. Alternatively the liner 205, core 210, and inner layer 215 may be rolled together in a hot rolling process such that the liner 205, core 210, and inner layer 215 are metallurgically bonded together. Applicant presently believes that the liner 205 of the material 200 may provide sacrificial protection when subjected to a corrosive environment (for example as when the material 200 is formed into a tube and used within a heat exchanger of a residential or commercial HVAC unit), the core 210 may provide sufficient high strength (for example as when the material 200 is formed into a tube and used within a heat exchanger of a residential or commercial HVAC unit), and the inner layer 215 may provide good formability and can be used for making surface textures that can enhance condensation and heat transfer (for example as when the material 200 is formed into a tube and used within a heat exchanger of a residential or commercial HVAC unit). In this manner, Applicant believes that the material 200 may be sufficiently corrosive resistant and of high strength to be used as a tube within a heat exchanger of a residential or commercial HVAC unit. The liner 205 may be between about 5 to about 20 percent of the total thickness of the material 200. The core 210 and the 215 may be approximately the same thicknesses and alternatively have a thickness within about 50% of each other. In various embodiments, the material 200 may having a total thickness ranging from about 0.3 millimeters to about 1.5 millimeters.

In some embodiments the corrosion potential difference between the core layer and the liner layer is in the range of 30 millivolts to 200 millivolts. In some embodiments the corrosion potential difference between the core layer and the liner layer is at least 30 millivolts.

In still further embodiments, with reference to FIGS. 3-6, the material 100 or 200 may be formed into a multi-layered tubestock 300. The multi-layered tubestock 300 may have a first edge 305 and a second edge 310. The first edge 305 and the second edge 310 may be bonded together to form a round bonded tube 400. Suitable bonding processes includes gluing, welding, soldering, and brazing. The outer diameter of the round bonded tubes 400, 400' may range from about 3 millimeters to about 30 millimeters; alternatively from about 3 millimeters to about 8 millimeters; alternatively from about 5 millimeters to about 7 millimeters. A plurality of fins 500, 500', 500", 500''' may be associated with each other. Each fin 500, 500', 500", 500''', etc. may have a plurality of bores 505A, 505B, and optionally 505C, etc. In an embodiment, each fin 500, 500', 500", 500''', etc. may have a length of ranging from about 5 inches to about 36 inches (alternatively about 18 inches) and a width ranging from about 0.5 inches to about 10 inches (alternatively about 1 inch). In an embodiment, the bores 505A, 505B, and optionally 505C, etc. may be arranged in an array of between about 1 to about 15 columns and between about 1 to about 5 rows.

In an embodiment, one or more of the round bonded tubes 400, 400', may be associated with, or inserted into, respective bores 505A, 505B, 505C, which may be sized to receive the round bonded tube 400, 400'. The round bonded tubes 400, 400', engaged, associated with, or inserted into, the fins 500, 500', 500", 500''', etc. may then be expanded. In an embodiment, the round bonded tubes 400, 400', are expanded by heat treatment to increase each round bonded tube 400, 400', by an amount varying from zero millimeters to about 1 millimeter.

To assemble a round tube and plate fin heat exchanger using a mechanical expansion process a cylindrical mandrel called a bullet is pushed into a tube and pressed through the entire length of the tube to be expanded. The outer diameter of the bullet is larger than the tube inter diameter such that the tube is expanded to larger outer diameter and therefore has a close mechanical contact with the plate fin.

When the bullet is pressed through the tube deformation strain is generated inside the tube. If the inside of the tube has embossed fins, sometimes referred to as enhancements, the strain will generate shear/compression deformation on the enhancements and tension deformation on the remainder of the tube. For a given difference between the bullet OD and tube ID, if the material on the inner diameter of the tube is soft, there will be more deformation on the enhancement than the remainder of the tube, which will cause high expansion force due to increased enhancement surface area and less expansion of the tube and, therefore, less intimate contact between the tube and fin. To achieve a good expandability and heat transfer performance it is desired to have less deformation on the enhancement but more expansion on the remainder of the tube.

A second liner on the tube internal surface can greatly improve the tube expandability. The liner alloy can be designed with a higher hardness than the core alloy such that the deformation on the enhancement is reduced and tube outer diameter expansion is enhanced during the expansion process. In addition to the mechanical property consideration the liner alloy can also be designed to have good brazeability.

The tube 400, 400', may have a high strength and good corrosion resistance. Applicant believes that the tubes formed of its disclosed material would have better properties as compared to extruded aluminum tube products for residential HVAC application. A summary of property data from certain embodiments follows, wherein the properties of the multi-layer tubestock are post braze properties that are similar to a full anneal condition:

Compositions of Lab Test Materials

| Alloy | Alloy ID | Si | Fe | Cu | Mn | Mg | Zn | Ti |
|---|---|---|---|---|---|---|---|---|
| Core Alloy | Sample alloy 1 | 0.06 | 0.20 | 0.55 | 1.10 | 0.05 | 0.10 | 0.15 |
| | Sample alloy 2 | 0.81 | 0.48 | 0.56 | 1.24 | 0.05 | 0.05 | 0.14 |
| Outer Liner | Sample 3xxx alloy + Zn | 0.78 | 0.24 | 0.05 | 1.64 | 0.05 | 1.52 | 0.05 |
| | Sample 7xxx alloy | 0.05 | 0.21 | 0.05 | 0.05 | 0.03 | 0.94 | — |

Sample Materials

| Sample ID | Liner | Core |
|---|---|---|
| B12-0144 | Sample 7xxx alloy | Sample alloy 1 |
| B12-0145 | Sample 3xxx alloy + Zn | Sample alloy 1 |
| B12-0146 | Sample 7xxx alloy | Sample alloy 2 |
| B12-0147 | Sample 3xxx alloy + Zn | Sample alloy 2 |

The compositions of the two layer materials are shown in the table above.
All materials were made O temper (fully recrystallized and soft condition), at a 0.5 mm gauge with a 10 per cent clad ratio.

Pre and Post Braze Tensile Properties

| | Pre Braze | | | Post Braze | | |
|---|---|---|---|---|---|---|
| Product | TS (ksi) | YS (ksi) | Elong. (%) | TS (ksi) | YS (ksi) | Elong. (%) |
| 3102 | 13.2 | 7.8 | 41.5 | 13.1 | 4.1 | 37.0 |
| B12-0144 | 21.6 | 8.4 | 22.3 | 19.8 | 7.1 | 26.4 |
| B12-0145 | 22.2 | 8.6 | 21.6 | 21.0 | 7.7 | 25.0 |
| B12-0146 | 22.6 | 8.5 | 22.8 | 23.1 | 8.4 | 19.8 |
| B12-0147 | 23.2 | 8.7 | 21.1 | 23.8 | 9.0 | 18.5 |

The 2-layer materials have higher strength than extruded 3102.

Electrochemical Potential of Experimental Materials

| | Pre Braze (mV) | | Post Braze (mV) | |
|---|---|---|---|---|
| ID | Core | Liner | Core | Liner |
| B12-0144 | −726.5 | −763.7 | −684.6 | −741.7 |
| B12-0145 | −726.4 | −901.1 | −685.0 | −776.1 |
| B12-0146 | −721.9 | −777.9 | −694.5 | −744.8 |
| B12-0147 | −723.4 | −903.2 | −692.9 | −775.1 |

The difference in electrochemical potential between liner 105 and core 110, or liner 205 and core 210, is such that the liner can provide good protection to the core. The difference is in a range of 30-200 mV for the pre braze materials and 30-150 mV for the post braze materials.

While a number of embodiments of the present disclosure have been described, it is understood that these embodiments are illustrative only, and not restrictive, and that many modifications and/or alternative embodiments may become apparent to those of ordinary skill in the art. All features disclosed in the specification, including the claims, abstracts, and drawings, and all the steps in any method or process disclosed, may be combined in any combination, except combinations where at least some of such features and/or steps are mutually exclusive. For example, any steps may be performed in any desired order (and any desired steps may be added and/or any desired steps may be deleted). Therefore, it will be understood that the appended claims are intended to cover all such modifications and embodiments that come within the spirit and scope of the present disclosure.

The invention claimed is:

1. A rolled aluminum alloy multi-layer sheet HVAC tube having an internal surface within the tube and an external surface outside the tube comprising:
   (A) a core layer,
   wherein the core layer consists of at least one of a: 3xxx, 5xxx or 6xxx aluminum alloy; and
   (B) an outer liner layer disposed on a first side of the core layer,
   wherein the outer liner layer is distinct from the core layer, and
   wherein the outer liner layer consists of
   (i) an outer liner layer aluminum alloy comprising a 3xxx aluminum alloy composition and an additional Zn component of 0.5-5% Zn over and above the Zn present in the 3xxx aluminum alloy, resulting in the outer liner layer aluminum alloy having a total Zn>1.3%, or
   (ii) a 7xxx aluminum alloy,
   wherein the aluminum sheet is in the form of the tube, with a bilayer laminate structure, the tube having a round cross-sectional shape with the outer liner layer defining at least a portion of the external surface of the tube, the exterior surface being smooth,
   wherein the internal surface of the tube is distal to the first side of the core layer,
   wherein a welded joint joins opposed edges of the sheet to form the tube, the welded joint extending along a length of the tube,
   wherein the welded joint has a microstructure different from the microstructure of the tube at locations other than at the welded joint, the welded joint forming a discontinuity in the bilayer laminate structure at the weld, the tube exhibiting corrosion resistance attributable to the outer liner layer proximate the discontinuity and is internally expandable up to 1 mm without cracking,
   wherein the tube has an O temper pre-braze tensile strength of at least 14 Ksi,
   wherein the post braze corrosion potential difference between the outer liner layer and core is at least 30 millivolts, and
   wherein the tube has a total wall thickness between 0.3 mm to 1.5 mm, the outer liner having a thickness that is from 5% to 20% of the total wall thickness of the tube.

2. The tube of claim 1 wherein the core layer comprises: 0.05-1.2% Si, up to 1.0% Fe, 0.10-1.0% Cu, 0.3-2.0% Mn, up to 1.0% Mg, up to 0.25% Cr, up to 0.25% Zn, 0.10-0.2% Ti, and up to 0.2% Zr.

3. The tube of claim 1 wherein the core layer comprises: up to 0.5% Si, up to 1.0% Fe, up to 0.5% Cu, up to 1.0% Mn, 0.1-3.0% Mg, up to 0.25% Cr, up to 0.25% Zn, up to 0.2% Ti, and up to 0.2% Zr.

4. The tube of claim 1 wherein the core layer comprises: 0.2-2.0% Si, up to 1.0% Fe, 0.10-1.0% Cu, up to 1.0% Mn, 0.25-1.5% Mg, up to 0.25% Cr, up to 0.25% Zn, up to 0.2% Ti, and up to 0.2% Zr.

5. The tube of claim 1 wherein the outer liner layer alloy comprises a 3xxx aluminum alloy and an additional Zn component of 0.7-4% Zn.

6. The tube of claim 1 wherein the outer liner layer alloy comprises a 3xxx aluminum alloy and an additional Zn component of 1-3% Zn.

7. The tube of claim 1 wherein the tube has an 0 temper pre-braze tensile strength of at least 16 Ksi.

8. The tube of claim 1 wherein the tube has an 0 temper pre-braze tensile strength of at least 18 Ksi.

9. The tube of claim 1 wherein the tube has an 0 temper pre-braze tensile strength of at least 20 Ksi.

10. The tube of claim 1, wherein the core layer and the outer liner layer are hot rolled and metallurgically bonded.

11. The tube of claim 1, wherein the core layer and the outer liner layer are a multi-alloy casting.

12. The tube of claim 1, wherein the diameter of the tube is between 3 mm to 30 mm.

13. An HVAC heat exchanger comprising:
    a tube in accordance with claim 1; and
      at least one external fin with a round aperture therein, the tube passing through the aperture in the external fin and contacting the external fin proximate the aperture, the tube being internally expanded outwardly by between 0 mm and 1 mm and engaging the external fin proximate the aperture.

14. The heat exchanger of claim 13, wherein the tube further comprises an inner layer on a side of the bilayer laminate structure, opposite the outer liner and within the tube.

15. The heat exchanger of claim 14 wherein the inner layer comprises a 3xxx alloy.

16. The heat exchanger of claim 14 wherein the inner layer comprises 0.05-1.2% Si, up to 1.0% Fe, 0.10-1.0% Cu, 0.3-2.0% Mn, and up to 0.5% Mg.

17. The heat exchanger of claim 14 wherein the inner layer comprises 1.0-12.0% Si, up to 1.0% Fe, up to 1.0% Cu, up to 1.0% Mn, and up to 0.5% Mg.

18. The heat exchanger of claim 13, wherein a plurality of embossed enhancements extend from an internal surface of the tube.

* * * * *